June 4, 1968   J. R. HENSLER ET AL   3,386,789
REFLECTIVE ELEMENT
Filed Feb. 12, 1965
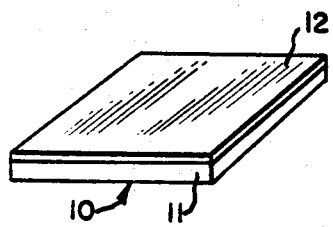
FIG. 1
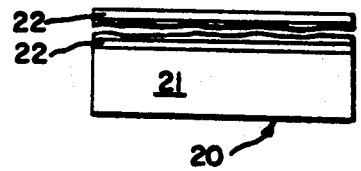
FIG. 2
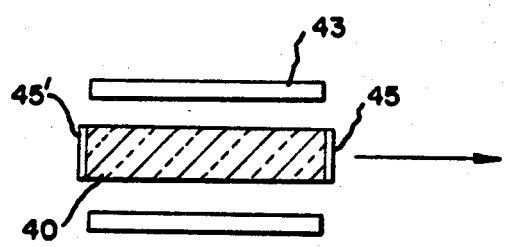
FIG. 3
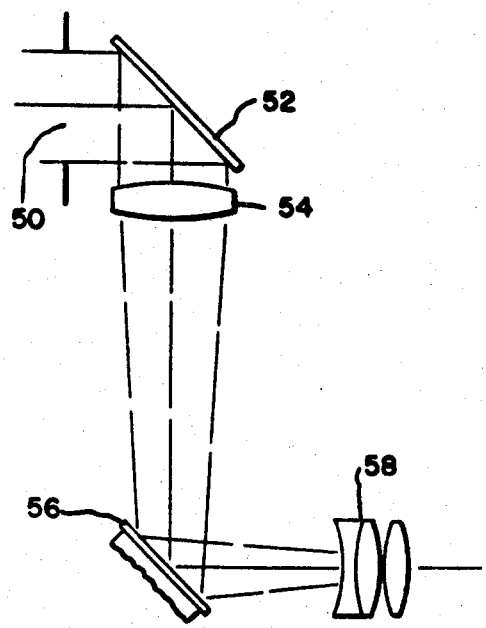
JOSEPH R. HENSLER
EUGENE C. LETTER
INVENTORS
BY
ATTORNEYS 3,386,789
REFLECTIVE ELEMENT
Joseph R. Hensler, Rochester, and Eugene C. Letter, Penfield, N.Y., assignors to Bausch & Lomb Incorporated, Rochester, N.Y., a corporation of New York
Filed Feb. 12, 1965, Ser. No. 432,235
6 Claims. (Cl. 350—160)

This invention relates to an optical element and more particularly to a reflecting element or light valve which is activated by a brief intense flash of radiation.

Recent developments in the field of the production of electromagnetic energy have provided a family of new devices for generating coherent radiation in the infrared, visible and ultraviolet frequency bands. Devices of this type are generally referred to as "lasers." The term "laser" is an acronym taken from light amplification by the stimulated emission of radiation.

Lasers have for the most part been utilized as laboratory light sources since they produce high density coherent radiation. Reports indicating laser applications in various fields which range from eye surgery to machine shop applications have contributed to an increased interest in laser devices. In view of this interest, there presently appears to be a relatively wide spread commercial market for a protective laser device wherein a light valve or optical shutter will be closed by a laser.

Advantageously, a device according to the present invention is activated by a brief intense pulse of electromagnetic radiation. Additionally, the brief intense pulse of radiation produces a change in the optical characteristics in an exceptionally brief interval of time. For example, an optical shutter or light valve according to the present invention may be opened or closed in a brief interval of time. The time interval is dependent upon the energy received from the pulse, however, the time interval has been found to range from a few milliseconds to the so-called "nanosecond" range. One nanosecond is equal to 0.001 microsecond or $1 \times 10^{-9}$ second.

Since the devices disclosed herein operate in extremely short intervals of time, it is also desirable to produce devices of sufficiently large apertures to thereby provide a practical application for the devices. Advantageously, the devices according to the present invention may have relatively large apertures without adversely affecting the extremely high speed. Only that portion of the shutter which is struck by the laser beam is closed. Accordingly, that portion of the element which is not struck by the laser beam will continue to reflect visible light.

Additionally, the devices disclosed herein are applicable as a protective goggle for protecting the eyes of an observer from the harmful effects of laser radiation. A goggle of this type would readily transmit visible light and yet would be activated by a light pulse emanating from a laser to thereby absorb and deflect the harmful intense beam of radiation. The design of the goggle is such that it will include the novel reflecting element according to the present invention. The reflecting element may be disposed in a manner similar to an inclined mirror in a periscope so that visible light will be reflected to the eye of an observer while a pulse of light will be transmitted out of the system.

Briefly, the optical element according to the present invention utilizes the nonlinear absorption effects of certain materials in a laser beam. A reflecting element comprising a cadmium sulfoselenide material reflects visible light but transmits an intense laser beam to thereby close the shutter to high intensity radiation. The preferred embodiment of the invention comprises a multi-layer film which includes alternate layers of a dielectric material and cadmium sulfoselenide.

The invention will now be described in connection with the accompanying drawings; in which, FIG. 1 is a perspective view illustrating an optical element according to a first embodiment of the invention;

FIG. 2 is a cross sectional view illustrating a preferred embodiment of the invention; and FIG. 3 is a side elevational view illustrating a device including a shutter according to the first embodiment of the invention.

The intrinsic optical properties of materials may be considered to be constant. For example, the polarizability of dielectric materials, the absorption coefficient and the index of refraction do not change significantly under normal conditions of illumination. An atom may be excited to thereby produce a change in the polarizability of the material since the polarizability of an atom in the excited state is not the same as for an atom in the ground state. If, however, the excited atoms represent an insignificant portion of the total number of atoms in the material at any time, there will be no apparent change in the optical properties of the material.

When the intensity of the light flux is sufficiently high, it will excite a significant percentage of the atoms, so that, those atoms are in a state of interaction with the radiation. Under these conditions, the optical properties may be influenced.

The relationship of index of refraction and absorption to concentration of oscillators is given by the following equation:

$$\frac{(h-jk)^2-1}{(n-jk)^2+2} \cdot \frac{1}{N} = \frac{1}{3}\sum_k \frac{f_k e/m\epsilon_0}{W_k^2 - W^2 + jWg_k}$$

where:

$n$ = index of refraction
$k$ = absorption coefficient
$N$ = No. of atoms per unit volume
$f_k$ = oscillator strength
$e$ = electronic charge
$m$ = electron mass
$\epsilon_0 = 8.85 \times 10^{-12}$ farads/m.
$W_k$ = natural frequency of $k$th atom
$W$ = frequency
$g_k$ = damping term $$g_k = \frac{2\pi c}{\lambda_k^2}\Delta\lambda_k$$

$\lambda_k$ = wavelength of absorption maximum
$\Delta\lambda_k$ = half width of absorption If $f_k$ is considered to denote $k$-type oscillators in the ground state, this expression shows the influence on the index of refraction or on the absorption obtained by exciting a large number of the $k$-type oscillators with a very large flux of radiation. Giant pulse laser beams produce coherent energy fluxes sufficient to induce these changes. For example, a cadmium sulfoselenide glass showed a change of about $10^7$ in its absorption under a 100 mw. cm.$^{-2}$ laser beam. The time constant was one nanosecond or less. A change of $10^7$ in the transmission constant implies significant changes in $f_k$ as well as in the index of refraction.

The element 10 shown in FIG. 1 may for example, comprise a glass substrate 11 and a cadmium sulfoselenide layer 12. The layer 12 consists essentially of cadmium sulfoselenide having a composition consisting essentially of 1 to 30% cadmium sulfide and 70 to 99% selenium. The preferred range includes between 2 and 10% cadmium sulfide.

While the layer 12 may comprise cadmium sulfoselenide glass within the aforementioned ranges, it is preferred to use multi-layer film including layers of cadmium sulfoselenide. A multi-layer film is shown schematically in FIG. 2. As illustrated therein, an element 20 comprises a substrate 21 and a plurality of layers 22. The layers 22 may comprise cadmium sulfoselenide, magnesium fluoride, cadmium sulfoselenide, magnesium fluoride, cadmium sulfoselenide, magnesium fluoride, cadmium sulfoselenide, magnesium fluoride, cadmium sulfoselenide, magnesium fluoride, cadmium sulfoselenide, magnesium fluoride, cadmium sulfoselenide, magnesium fluoride, cadmium sulfoselenide, cadmium sulfoselenide, magnesium fluoride, cadmium sulfoselenide, and cadmium sulfoselenide. The thicknesses of the layers according to a preferred embodiment of the invention are ¼λ wherein λ=540.

The deposition of the multiple layers may be accomplished in accordance by conventional vacuum coating techniques. Magnesium fluoride has been conventionally used for multi-layer or interference filters and may be readily deposited under a wide range of conditions. Deposition of the cadmium sulfoselenide layers are accomplished by co-evaporating cadium sulfide and selenium from two sources within a vacuum chamber. The selenium is evaporated at a relatively low temperature while the cadmium sulfide is evaporated at a higher temperature. The relative temperatures are controlled in order to obtain the desired amount of cadmium sulfide and selenium in the film.

When the cadmium sulfoselenide comprises a thin film it is used as the high index member of a multi-layer dielectric high reflection filter. This approach requires designing the multi-layer stack, so that, the material used with the cadmium sulfoselenide approaches the refractive index of the lower index material when it is subjected to a laser beam. In this way the reflectively would drop to a minimum when subjected to an incident laser beam.

In some cases the cadmium sulfoselenide may be formed into a glass so that, the element would include only a cadmium sulfoselenide plate. The transmission constant of such a plate increases by about seven orders of magnitude, from $10^{-6}$ to 30 percent, in one nanosecond. Changes in index of refraction implied by this transmission change can be utilized for optical shutters. For example, the high refractive index of the cadmium sulfoselenide may make its use as a reflecting element in an optical system desirable. Under a high power laser beam the light would be transmitted out of the optical system rather than reflected into it.

FIG. 3 illustrates an optical shutter which includes an optical element according to one embodiment of the invention. The light rays passing through an aperture 50 are reflected by an inclined mirror 52. The reflected light passes through a lens 54 and is incident upon an optical element 56. When the shutter is in an open condition the light is reflected by the element 56 and directed through a lens assembly 58. The lens assembly 58 forms an image at a selected image plane (not shown).

A laser which produces a pluse of coherent light comprises a rod 40 such as crystal or glass having reflective and parallel end plates 45, 45'. An energy source such as a plurality of lamps 43 is disposed about the chamber for pumping the laser. The reflectors 45, 45' are disposed adjacent each end of the rod 40 and are adapted to reflect the light generated therein between the reflectors 45, 45' until it is emitted. When a pulse of electromagnetic radiation of predetermined characteristics strikes the element 56 it destroys the reflectivity thereof to close the shutter.

While the invention has been described in detail with reference to the specific embodiment it should be understood that it may be modified or embodied in other forms without departing from the scope of the appended claims.

What is claimed is:

1. An optical system including means for receiving incident light and directing the incident light along an optical axis of the system, a non-linear absorbing element consisting essentially of a cadmium sulfoselenide layer reflecting incident light along the optical axis of the system and transmitting a pulse of high intensity coherent radiation to thereby close the system to high intensity pulses of light.

2. An optical system including a laser and a cadmium sulfoselenide layer reflecting incident light along an optical axis of the system and transmitting the laser radiation to thereby close the system to pulses of high energy radiation.

3. An optical system including means for receiving incident light and directing the incident light along a optical axis of the system, a laser, and a non-linear absorbing element consisting essentially of a cadium sulfoselenide layer disposed on the optical axis of the system and adapted for reflecting incident light along the optical axis of the system and transmitting a pulse of high intensity coherent radiation from the laser to thereby close the system to laser radiation.

4. An optical system according to claim 3 in which the non-linear absorbing element consists essentially of cadmium sulfoselenide glass.

5. An optical system according to claim 3 in which the non-linear absorbing element consists essentially of a multi-layer film which includes a layer of cadmium sulfoselenide.

6. An optical system according to claim 5 in which the multi-layer film comprises cadmium sulfoselenide, magnesium fluoride, cadmium sulfoselenide, magnesium fluoride, cadmium sulfoselenide, magnesium fluoride, cadmium sulfoselenide, magnesium fluoride, cadmium sulfoselenide, cadmium sulfoselenide, magnesium fluoride, cadmium sulfoselenide, magnesium fluoride, cadmium sulfoselenide, cadmium sulfoselenide, magnesium fluoride, cadmium sulfoselenide, and cadmium sulfoselenide.

No references cited.

JEWELL H. PEDERSEN, *Primary Examiner.*

W. L. SIKES, *Assistant Examiner.*